United States Patent
Bent et al.

(10) Patent No.: US 8,250,140 B2
(45) Date of Patent: Aug. 21, 2012

(54) ENABLING CONNECTIONS FOR USE WITH A NETWORK

(75) Inventors: Graham A Bent, Southampton (GB); Flavio A Bergamaschi, Southampton (GB); Patrick Dantressangle, Chandlers Ford (GB); Christopher Gibson, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 658 days.

(21) Appl. No.: 12/101,220

(22) Filed: Apr. 11, 2008

(65) Prior Publication Data

US 2009/0083379 A1   Mar. 26, 2009

(51) Int. Cl.
*G06N 5/02* (2006.01)
*G06F 15/16* (2006.01)

(52) U.S. Cl. ......... 709/204; 709/223; 709/225; 709/226

(58) Field of Classification Search .................. 709/204, 709/205–207, 223–229; 715/733–759; 707/770, 707/966–974; 370/229, 230, 230.1, 231, 370/232, 234, 235, 468, 260
See application file for complete search history.

(56) References Cited

U.S. PATENT DOCUMENTS

| | | | | |
|---|---|---|---|---|
| 5,978,356 A * | 11/1999 | Elwalid et al. | ................ | 370/230 |
| 6,931,016 B1 * | 8/2005 | Andersson et al. | ........... | 370/401 |
| 6,968,389 B1 * | 11/2005 | Menditto et al. | ............. | 709/233 |
| 7,099,888 B2 | 8/2006 | Gollapudi et al. | | |
| 7,433,942 B2 * | 10/2008 | Butt et al. | ..................... | 709/223 |
| 7,532,623 B2 * | 5/2009 | Rosenzweig et al. | ......... | 370/390 |
| 7,647,411 B1 * | 1/2010 | Schiavone et al. | ............ | 709/229 |
| 7,660,891 B2 * | 2/2010 | Black | ............................ | 709/224 |
| 2003/0061209 A1 | 3/2003 | Raboczi et al. | | |
| 2003/0212664 A1 | 11/2003 | Breining et al. | | |
| 2005/0038810 A1 | 2/2005 | Brodersen et al. | | |
| 2006/0133428 A1 * | 6/2006 | Guthrie et al. | ................ | 370/519 |

FOREIGN PATENT DOCUMENTS

EP   0625756   1/2000

OTHER PUBLICATIONS

George Fernandez, A Federated Approach to Enterprise Integration, Faculty of Information and Communication Technologies, Swinburne University of Technology, 2006 (Source: http://adt.lib.swin.edu.au/uploads/approved/adt-VSWT20060502.113336/public/02whole.pdf).

(Continued)

*Primary Examiner* — Wing Chan
*Assistant Examiner* — Ruolei Zong
(74) *Attorney, Agent, or Firm* — Yudell Isidore Ng Russell PLLC (57) ABSTRACT

An apparatus for enabling connections for use with a network comprising at least one vertex, the apparatus comprising: a receiver, for receiving a first message associated with the first vertex, wherein the first message comprises an indication that the first vertex wishes to join the network; a generator, responsive to receipt of the first message, for generating a second message associated with the at least one vertex, wherein the second message comprising an indication that the at least one vertex is operable to connect to the first vertex; and a probabilistic component for determining a first time value associated with transmission of the second message to the first vertex in accordance with probabilistic data.

19 Claims, 5 Drawing Sheets

OTHER PUBLICATIONS

Kazimeirz Subieta, Mapping Heterogenous Ontologies through Object Views, Polish-Japanese Institute of Information Technologies & Institute of Computer Science PAS, Warsaw, Poland, (Source: http://www.si.pjwstk.edu.pl/publications/papers/EFIS2000MappingHeterogeneousOntologies.pdf).

B. Chandramouli, et al., Distributed Network Querying with Bounded Approximate Caching, Dept. of Computer Science, Duke University {badrish, junyang}@cs.duke.edu 2) Dept. of Computer Science and Engg., University of California, San Diego vandat@cs.ucsd.edu, (Source: http://www.cs.duke.edu/dbgroup/papers/2006-DASFAA-cyv-netcache.pdf).

Hanna Kozankiewicz, et al., Implementation of Federated Databases through Updatable Views, Springer Berlin / Heidelberg, vol. 3470/2005, https://www.springerlink.com/content/5e8ufhju6b2ad8kx/resource-secured/?target=fulltext.pdf.

Bent, et al., Formal Properties of Distributed Database Networks, Submitted by webmaster on Aug. 16, 2007; link available on Sep. 3, 2007, #City College of NY (CUNY), Convent Ave. at 138th St., NY, NY 10031, USA; IBM, Emerging Technology Services, Hursley Park, MP137, Winchester, Hants. SO21 2JN, UK.

\* cited by examiner

ENABLING CONNECTIONS FOR USE WITH A NETWORK

This invention was made with United States Government support under Agreement No. W911NF-06-3-0001, awarded by the U.S. Army. The Government has certain rights in the invention.

FIELD OF THE INVENTION

The present invention relates to an apparatus for enabling connections.

BACKGROUND

Typically, a network comprises a number of vertices (e.g. representing data processing systems) and a number of edges, wherein an edge represents a connection (e.g. a network connection) between two vertices.

In a prior art network connection strategy, a first vertex wishing to join an existing network queries, in turn, a plurality of vertices associated with the existing network in order to determine one or more vertices to connect to.

This strategy requires multiple queries to be performed and is serial in its nature, hence inefficient.

SUMMARY

According to a first aspect there is provided an apparatus for enabling connections for use with a network comprising at least one vertex, the apparatus comprising: a receiver, for receiving a first message associated with the first vertex, wherein the first message comprises an indication that the first vertex wishes to join the network; a generator, responsive to receipt of the first message, for generating a second message associated with the at least one vertex, wherein the second message comprising an indication that the at least one vertex is operable to connect to the first vertex; and a probabilistic component for determining a first time value associated with transmission of the second message to the first vertex in accordance with probabilistic data.

According to a second aspect there is provided a method for enabling connections for use with a network comprising at least one vertex, the method comprising: receiving a first message associated with the first vertex, wherein the first message comprises an indication that the first vertex wishes to join the network; generating, in response to receipt of the first message, a second message associated with the at least one vertex, wherein the second message comprising an indication that the at least one vertex is operable to connect to the first vertex; and determining a first time value associated with transmission of the second message to the first vertex in accordance with probabilistic data.

According to a third aspect there is provided a computer program product including computer readable medium having computer program code means adapted to perform all the steps of the method described above when said program is run on a computer.

BRIEF DESCRIPTION OF THE DRAWINGS

The present invention will now be described, by way of example only, with reference to preferred embodiments thereof, as illustrated in the following drawings.

DETAILED DESCRIPTION OF THE PREFERRED EMBODIMENT

Figure 1A:
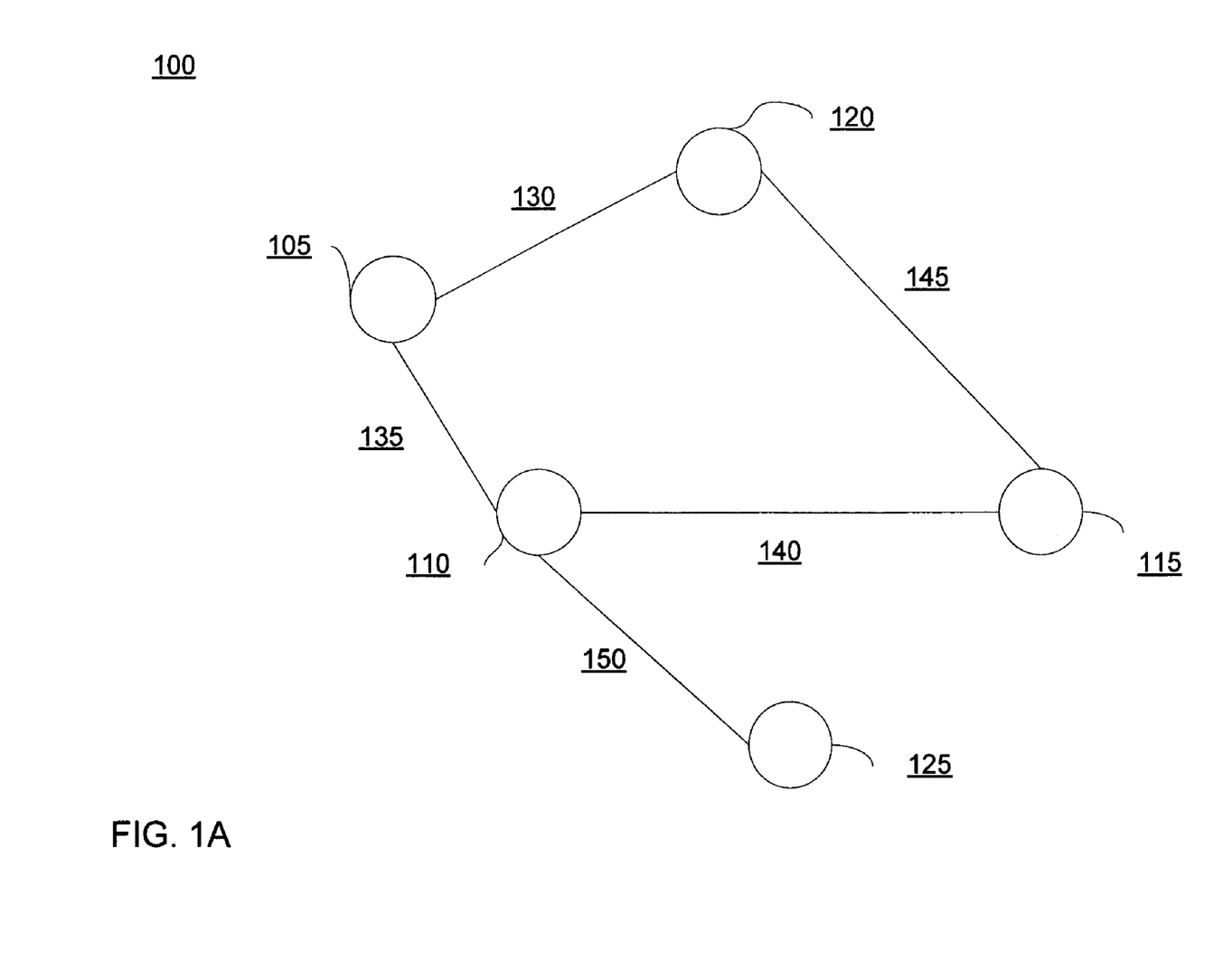
FIG. 1A depicts an illustrative overview of a sample network of data processing systems in which to practice an embodiment of the invention.

It should be understood that a known network connection strategy associated with scale-free networks is termed preferential attachment. A first vertex queries, in turn, a plurality of vertices in order to determine a number of edges associated with each of the plurality of vertices. In response, the first vertex determines probabilistically one or more vertices to connect to. A probability of a second vertex being chosen is proportional to a number of edges of the second vertex. This results in scale-free networks having a number of highly connected vertices (known as hubs). The number of hubs in relation to the number of non-hubs remains constant as a scale-free network changes in size. As described above, this type of network connection strategy is inefficient as it requires multiple queries to be performed and is serial in its nature FIG. 1A depicts an overview of a sample network (100) comprising a number of vertices (105, 110, 115, 120 and 125) and edges (130, 135, 140, 145 and 150).

Figure 2:
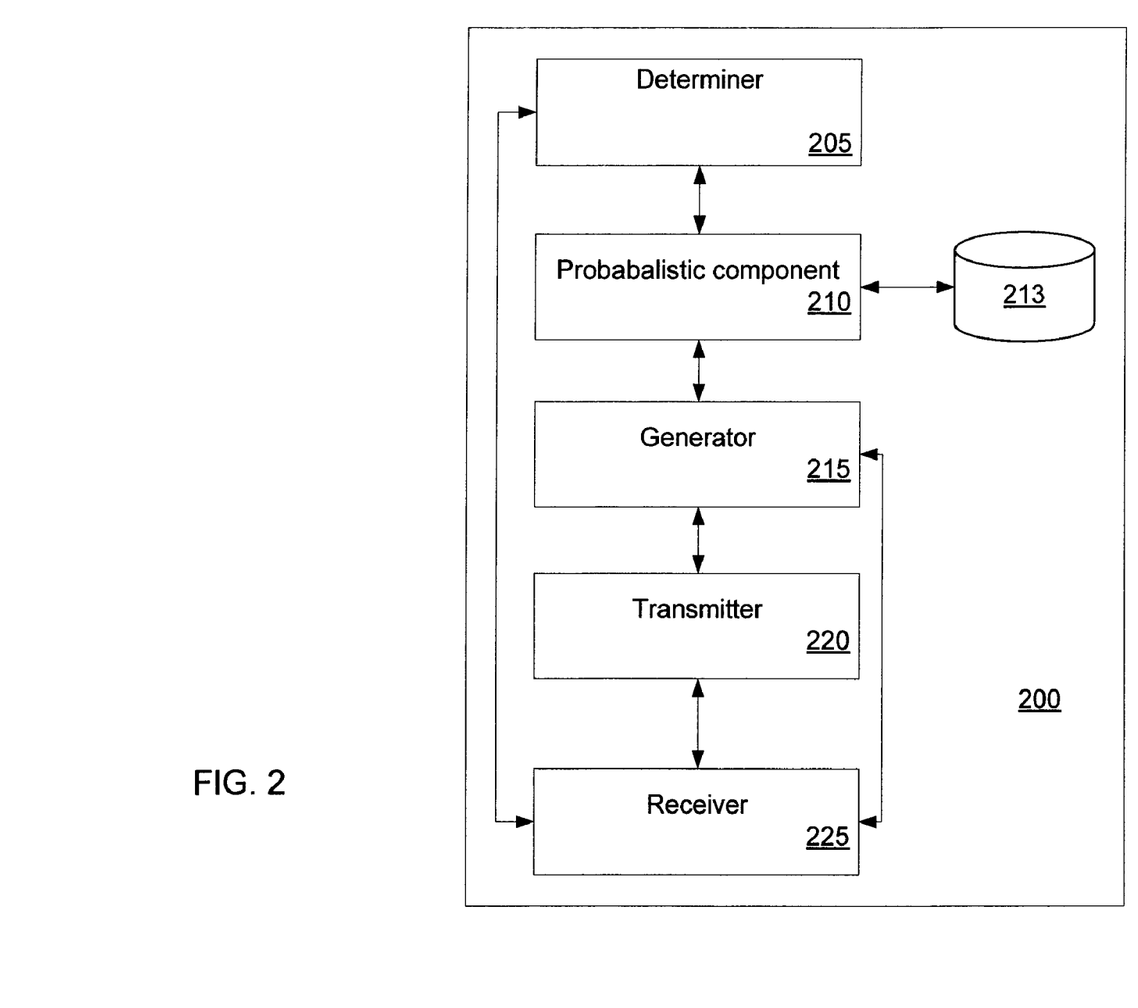
FIG. 2 is a block diagram of an illustrative apparatus according to a preferred embodiment of the present invention.

Each vertex is associated with an apparatus (200) according to a preferred embodiment. A block diagram of the apparatus (200) is shown in FIG. 2, wherein the apparatus (200) comprises a determiner (205); a probabilistic component (210) associated with a storage component (213) comprising probabilistic data; a generator (215); a transmitter (220) and a receiver (225).

A process according to a preferred embodiment will now be described with reference to the figures.

Figure 3:
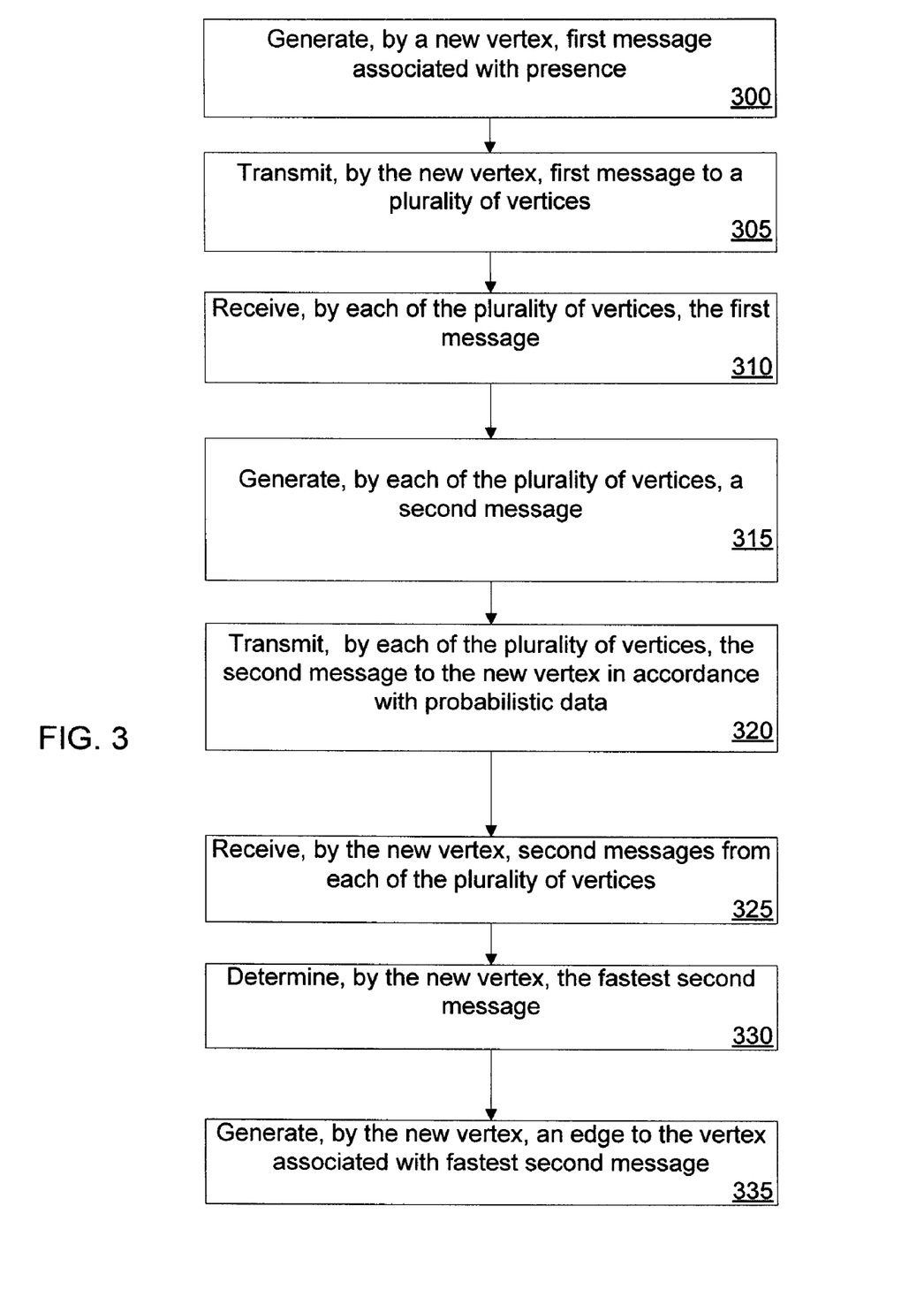
FIG. 3 is a flow chart showing the operational steps involved in a process in accordance with the preferred embodiment.

With reference to FIG. 3, when a new vertex is to join the network (100), the generator (215) generates (step 300) a first message. Preferably, the first message comprises an identifier associated with the new vertex and an indicator indicating that the new vertex wishes to join the network (100).

In a first example, in response to step 300, the transmitter (220) transmits (step 305) a copy of the first message to each of the vertices (105, 110, 115, 120 and 125) in the network (100) (preferably by using identifiers associated with each of the vertices (105, 110, 115, 120 and 125)).

In the first example, the receiver (225) of each of the vertices (105, 110, 115, 120 and 125)) receives (step 310) a copy of the first message.

In response to receipt of a copy of the first message, the generator (215) of a vertex generates (step 315) a second message comprising an identifier associated with the vertex. The generator (215) passes the second message to the transmitter (220). Preferably, the second message comprises an indicator indicating that the vertex is operable to make a connection to the new vertex.

In response to receipt of a copy of the first message, the determiner (205) of a vertex, determines a number of edges associated with the vertex.

In the first example, a first vertex (105) comprises two edges; a second vertex (110) comprises three edges; a third vertex (115) comprises two edges; a fourth vertex (120) comprises two edges and a fifth vertex (125) comprises one edge.

It should be understood that a number of edges associated with a vertex can be associated with, for example, the processing capability of the vertex.

The determiner (205) passes data associated with the determined number of edges to the probabilistic component (210).

The probabilistic component (210) of a vertex uses the data associated with the determined number of edges and probabilistic data stored in the storage component (213) to determine a value of a maximum time delay "$T_d$" that the vertex will wait before transmitting the second message to the new vertex.

The probabilistic data is shown below, wherein the value of "$T_d$" is inversely proportional to the number of edges ("$N_d$"). A value "$t_0$" is a constant used by every vertex:

$$T_d = t_0/N_d$$

In response to determining a value of "$T_d$", the probabilistic component (210) determines a time delay "$t_d$" by randomly selecting a value between "0" and "$T_d$".

In the first example, a representation of values for time delay "$t_d$" is shown below.

Preferably, probabilistically, a value for time delay "td" is inversely proportional to the number of edges:

| Number of edges | "$T_d$" |
|---|---|
| 1 | 8 |
| 2 | 6 |
| 3 | 4 |
| 4 | 2 |

In the first example, the first vertex (105) having two edges (130, 135) has an associated value for "$t_d$" of 3 ms; the second vertex (110) having three edges (135, 140, 150) has an associated value for "$t_d$" of 4 ms; the third vertex (115) having two edges (140, 145) has an associated value for "$t_d$" of 3 ms; the fourth vertex (120) having two edges (130, 145) has an associated value for "$t_d$" of 6 ms and the fifth vertex (125) having one edge (150) has an associated value for "$t_d$" of 7 ms.

The probabilistic component (210) passes the value for "$t_d$" to the transmitter (220).

The transmitter (220) transmits (step 320) the second message in accordance with the value for "$t_d$".

In the first example, a second message associated with the first vertex (105) is sent after a time delay of 3 ms; a second message associated with the second vertex (110) is sent after a time delay of 4 ms; a second message associated with the third vertex (115) is sent after a time delay of 3 ms; a second message associated with the fourth vertex (120) is sent after a time delay of 6 ms and a second message associated with the fifth vertex (125) is sent after a time delay of 7 ms.

Thus, preferably, a vertex with a higher number of edges responds probabilistically faster than a vertex with a lower number of edges.

However, a random selection of "$t_d$" allows for a degree of randomness associated with the time of response. For example, a vertex with a higher number of edges may respond slower than a vertex with a lower number of edges.

In the first example, at step 325, the receiver (225) of the new vertex receives each of the second messages.

In the first example, the determiner (205) of the new vertex ranks the second messages in accordance with a time value associated with receipt. The determiner (205) uses the second messages to determine (step 330) identifiers associated with a pre-configurable number of vertices having an associated second message that has a fastest time value associated with receipt. It should be understood that the pre-configurable number can be associated with pre-configurable number of connections that can be made to the new vertex.

Typically, a time value associated with receipt is proportional to "$t_d$".

However, due to differing delays associated with network connections and lost messages for example, a time value associated with receipt may not be proportional to "$t_d$".

In the first example, the pre-configurable number is "1" and the identifier is associated with the second vertex (110) having an associated second message that has a fastest time value associated with receipt.

In response to the determination, the generator (215) of the new vertex generates (step 335) an edge to the second vertex (110).

Figure 1B:
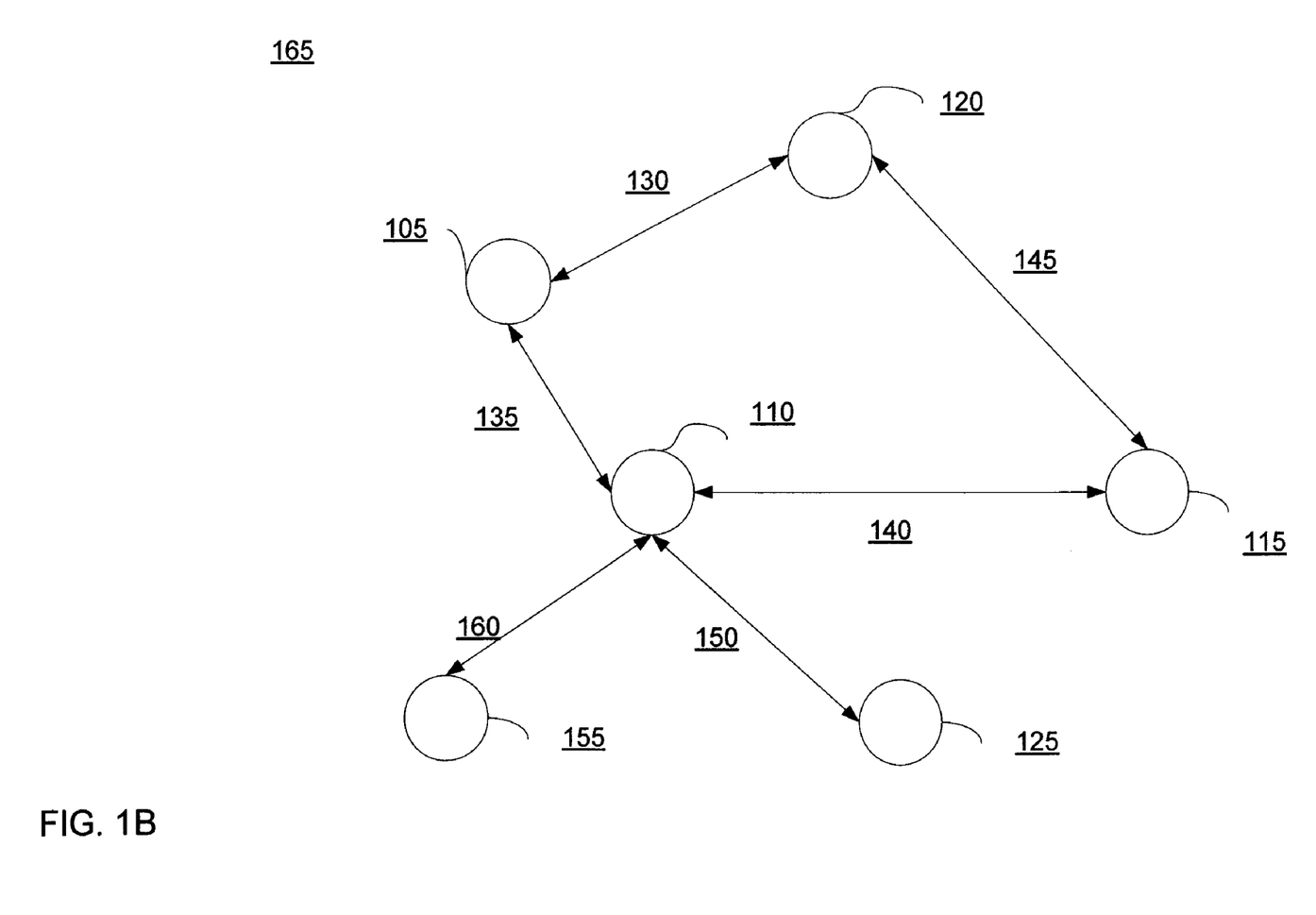
FIG. 1B depicts an illustrative overview of the sample resulting network when a new vertex connects to then network of FIG. 1A in accordance with an embodiment of the present invention.

An overview of the sample network (165) is shown in FIG. 1B, wherein the new vertex (155) is connected to the second vertex (110) by an edge (160).

It should be understood that the sample apparatus of the preferred embodiment is also operable to be executed, for example, when a connection between two existing vertices of the network (100) fails.

Preferably, when a pre-configurable number of vertices have connected to the new vertex, a vertex that is yet to send a second message (e.g. because the vertex has a long time delay) is suppressed from sending the second message.

Preferably, a vertex is adapted to maintain a configurable number ($n_{out}$) of "outgoing" edges. With reference to the network (170) in FIG. 1C and with reference to a first vertex (175), an outgoing edge is an edge that originates from the first vertex (175) to another vertex—e.g. edges 191, 192 and 193 to vertices 180, 185 and 190 respectively. In an example, the first vertex (175) is adapted to maintain three outgoing edges.

Figure 1C:
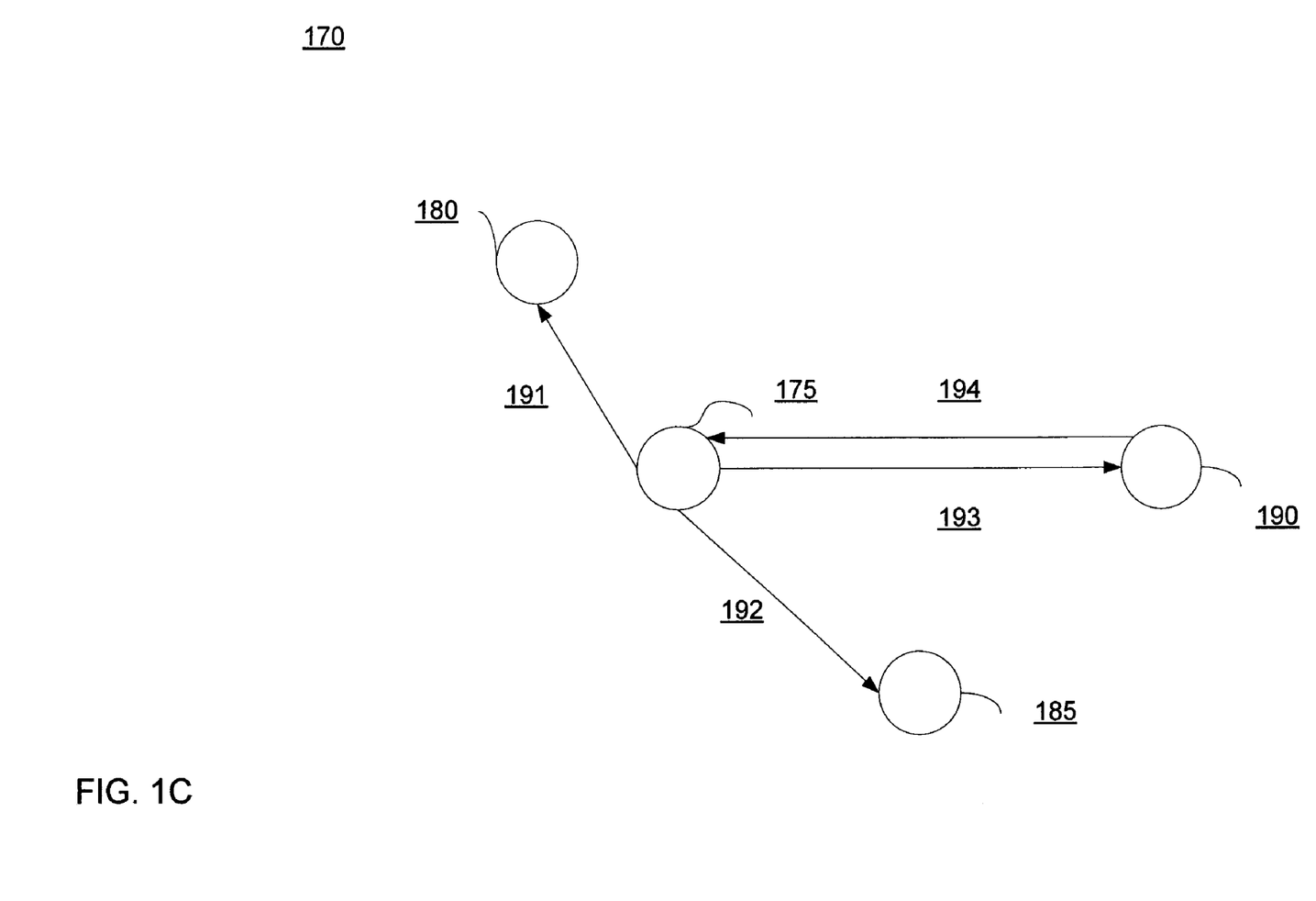
FIG. 1C depicts an illustrative overview of a sample network comprising outgoing and incoming edges of vertices in accordance with an embodiment of the present invention.

Preferably, a vertex also has a configurable number ($n_{in}$) of "incoming" edges available for a new vertex to connect to the vertex. With reference to FIG. 1C and with reference to a first vertex (175), for example, the first vertex (175) has a maximum number of one incoming edge. In FIG. 1C, the incoming edge has been used (e.g. edge 194 from vertex 190).

If by making a connection to a new vertex, the sum of $n_{out}$ and $n_{in}$ is to be exceeded (that is, if the vertex has no further available edges), preferably, the vertex is suppressed from sending the second message. For example, the first vertex (175) has no further available edges as each of the three outgoing edges is used and the one incoming edge is also used. Preferably the first vertex (175) is suppressed from sending the second message.

Advantageously, the preferred embodiment provides an apparatus and method for generating an edge associated with a network without requiring multiple queries to be issued. Furthermore, the apparatus and method of the preferred embodiment is parallel in its nature, in that a new vertex need not query each existing vertex in turn. Rather, the new vertex "broadcasts" a first message.

Advantageously, the apparatus and method of the preferred embodiment can be used in the generation of scale-free networks.

Although, probabilistically an edge is generated to a vertex with a higher number of edges (e.g. wherein the vertex has a higher processing capability), because a random selection of "td" can mean that a vertex with a higher number of edges may respond slower than a vertex with a lower number of edges and because differing delays associated with network connections and lost messages for example, can mean that a time value associated with receipt may not be proportional to "td", there is provided a degree of randomness associated with the selection of a vertex to which an edge is generated. Thus advantageously, a highly connected vertex may not always be the vertex to which an edge is generated, resulting in a fairer connection strategy.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the preferred embodiment of the present invention may be realized in the form of computer implemented method of deploying a service comprising steps of deploying computer program code operable to, when deployed into a computer infrastructure and executed thereon, cause said computer system to perform all the steps of the described method.

It will be clear to one skilled in the art that many improvements and modifications can be made to the foregoing exemplary embodiment without departing from the scope of the present invention.

The invention claimed is:

1. An apparatus for enabling connections for use with a network, the apparatus comprising:
   a receiver of at least one vertex of a plurality of vertices in the network, receiving a first message associated with a first vertex, wherein the first message is broadcast to each of the plurality of vertices via a single query, wherein the first message comprises an indication that the first vertex wishes to join the network, wherein each of the plurality of vertices is connected to one or more other vertices of the plurality of vertices by an edge, wherein an edge is a connection of one vertex with another vertex in the plurality of vertices, and wherein the number of edges of a vertex is associated with the processing capability of the vertex;
   a generator of the at least one vertex, responsive to receipt of the first message, generating a second message associated with the at least one vertex, wherein the second message indicates to the first vertex that the at least one vertex is operable to connect to the first vertex;
   a probabilistic component of the at least one vertex, determining a first time value associated with transmission of the second message to the first vertex, wherein the first time value is a maximum amount of time to delay before transmitting the second message and is inversely proportional to the number of edges in the network; and
   in response to determining the amount of time specified in the first time value expiring, a transmitter of the at least one vertex transmitting the second message to the first vertex;
   wherein the first vertex generates an edge with a fastest responding vertex of the at least one vertex of the plurality of vertices having the associated second message that has a fastest time value associated with receipt.

2. The apparatus as claimed in claim 1, wherein the first time value is a maximum time value associated with transmission of the second message to the first vertex calculated by dividing a constant by the number of edges of the at least one vertex, wherein the constant is the same for each vertex of the plurality of vertices.

3. The apparatus as claimed in claim 2, wherein the first time value has a value between 0 (zero) and the maximum time value.

4. The apparatus as claimed in claim 3, wherein the first time value is a randomly selected a time delay between 0 (zero) and the maximum time value.

5. The apparatus as claimed in claim 1, further comprising suppressing transmission of the second message in response to at least one of:
   a pre-configurable number of the at least one vertex connecting to the first vertex, and
   a pre-configurable number of connections of the at least one vertex being unavailable for connection to the first vertex.

6. The apparatus as claimed in claim 1, further comprising, a determiner, in response to receipt of the second message, determining a second time value associated with the receipt of the second message.

7. The apparatus as claimed in claim 6, further comprising, ranking, by the determiner, the second message in accordance with the second time value.

8. The apparatus as claimed in claim 7, wherein a highest rank is associated with a fastest second time value.

9. The apparatus as claimed in claim 7, further comprising, generating, by the generator, a connection from the first vertex to a vertex selected in accordance with the rank determined by the determiner.

10. A computer implemented method of enabling connections for use with a network, the method comprising:

at least one vertex of a plurality of vertices in the network receiving a first message associated with a first vertex, wherein the first message is broadcast to each of the plurality of vertices via a single query, wherein the first message comprises an indication that the first vertex wishes to join the network, wherein each of the plurality of vertices is connected to one or more other vertices of the plurality of vertices by an edge, wherein an edge is a connection of one vertex with another vertex in the plurality of vertices, and wherein the number of edges of a vertex is associated with the processing capability of the vertex;

generating, in response to receipt of the first message, a second message associated with the at least one vertex, wherein the second message indicates to the first vertex that the at least one vertex is operable to connect to the first vertex;

determining a first time value associated with transmission of the second message to the first vertex, wherein the first time value is a maximum amount of time to delay before transmitting the second message and is inversely proportional to the number of edges in the network; and in response to determining the amount of time specified in the first time value expiring, a transmitter of the at least one vertex transmitting the second message to the first vertex;

wherein the first vertex generates an edge with a fastest responding vertex of the at least one vertex of the plurality of vertices having the associated second message that has a fastest time value associated with receipt.

11. The method of claim 10, wherein the first time value is a maximum time value associated with transmission of the second message to the first vertex calculated by dividing a constant by the number of edges of the at least one vertex, wherein the constant is the same for each vertex of the plurality of vertices.

12. The method of claim 11, wherein the first time value has a value between 0 (zero) and the maximum time value.

13. The method of claim 12, wherein the first time value is a randomly selected a time delay between 0 (zero) and the maximum time value.

14. The method of claim 10, further comprising suppressing transmission of the second message in response to at least one of:
   a pre-configurable number of the at least one vertex connecting to the first vertex, and
   a pre-configurable number of connections of the at least one vertex being unavailable for connection to the first vertex.

15. The method of claim 10, further comprising:
   determining, in response to receipt of the second message, a second time value associated with the receipt of the second message.

16. The method of claim 15, further comprising, ranking the second message in accordance with the second time value.

17. The method of claim 16, further comprising, associating a highest rank with a fastest second time value.

18. The method of claim 16, further comprising, generating a connection from the first vertex to a vertex selected in accordance with a determined rank.

19. A computer program product having a non-transitory computer-readable storage medium having a plurality of instructions processable by a machine, wherein the plurality of instructions, when processed by the machine, cause the machine to perform a method, the method comprising:

at least one vertex of a plurality of vertices in the network receiving a first message associated with a first vertex, wherein the first message is broadcast to each of the plurality of vertices via a single query, wherein the first message comprises an indication that the first vertex wishes to join the network, wherein each of the plurality of vertices is connected to one or more other vertices of the plurality of vertices by an edge, wherein an edge is a connection of one vertex with another vertex in the plurality of vertices, and wherein the number of edges of a vertex is associated with the processing capability of the vertex;

generating, in response to receipt of the first message, a second message associated with the at least one vertex, wherein the second message indicates to the first vertex that the at least one vertex is operable to connect to the first vertex;

determining a first time value associated with transmission of the second message to the first vertex, wherein the first time value is a maximum time value associated with transmission of the second message to the first vertex, and is inversely proportional to the number of edges in the network, wherein the maximum time value is calculated by dividing a constant by the number of edges of the at least one vertex, wherein the constant is the same for each vertex of the plurality of vertices, and wherein the first time value is a randomly selected a time delay between 0 (zero) and the maximum time value;

suppressing transmission of the second message in response to at least one of:
   a pre-configurable number of the at least one vertex connecting to the first vertex, and
   a pre-configurable number of connections of the at least one vertex being unavailable for connection to the first vertex;

in response to determining the amount of time specified in the first time value expiring, a transmitter of the at least one vertex transmitting the second message to the first vertex;

determining, in response to receipt of the second message, a second time value associated with the receipt of the second message;

ranking the second message in accordance with the second time value;

associating a highest rank with a fastest second time value; and generating a connection from the first vertex to a vertex selected in accordance with a determined rank;

wherein the first vertex generates an edge with a fastest responding vertex of the at least one vertex of the plurality of vertices having the associated second message that has a fastest time value associated with receipt.

* * * * *